US 12,341,701 B1

(12) United States Patent
Zhang et al.

(10) Patent No.: US 12,341,701 B1
(45) Date of Patent: Jun. 24, 2025

(54) TRAFFIC SHAPING DETECTION AND BANDWIDTH ESTIMATION FOR A NETWORK

(71) Applicant: Agora Lab, Inc., Santa Clara, CA (US)

(72) Inventors: Huaming Zhang, Shanghai (CN); Zesen Zhuang, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 18/417,085

(22) Filed: Jan. 19, 2024

(51) Int. Cl.
*H04L 47/22* (2022.01)
*H04L 47/12* (2022.01)
*H04L 47/283* (2022.01)

(52) U.S. Cl.
CPC .............. *H04L 47/22* (2013.01); *H04L 47/12* (2013.01); *H04L 47/283* (2013.01)

(58) Field of Classification Search
CPC ... H04L 43/0852; H04L 43/16; H04L 43/087; H04L 45/304; H04L 43/0894; H04L 47/22
See application file for complete search history.

(56) References Cited

U.S. PATENT DOCUMENTS

| | | | | |
|---|---|---|---|---|
| 6,697,369 | B1 * | 2/2004 | Dziong | H04L 47/225 370/395.2 |
| 11,463,367 | B1 * | 10/2022 | Iyer | H04L 47/2441 |
| 2005/0097217 | A1 * | 5/2005 | Val | H04L 43/0882 709/233 |
| 2018/0034702 | A1 * | 2/2018 | Bungert | H04L 41/0896 |
| 2018/0063019 | A1 * | 3/2018 | Martin | H04L 43/16 |
| 2018/0367421 | A1 * | 12/2018 | Cloonan | H04L 43/091 |
| 2019/0372857 | A1 * | 12/2019 | Gandhi | H04L 41/0826 |
| 2024/0430206 | A1 * | 12/2024 | Zhao | H04L 47/2425 |

OTHER PUBLICATIONS

Abendroth, D., Killat, U. An Advanced Traffic Engineering Approach Based on the Approximate Invariance of Effective Bandwidths. Telecommunication Systems 27, 393-411 (2004). https://doi.org/10.1023/B:TELS.00000410176132259 (Year: 2004).*

(Continued)

*Primary Examiner* — Djenane M Bayard
(74) *Attorney, Agent, or Firm* — Young Basile Hanlon & MacFarlane, P.C.

(57) ABSTRACT

Apparatus, method and non-transitory computer readable medium for bandwidth estimation for a network using traffic shaping detection are provided, including selecting periodically sampled packets from the network, bandwidth samples each having a delay jitter greater than a jitter threshold, the delay jitter of a packet determined as the difference between a delay for the packet in the network and a minimum delay for all packets sampled within a delay statistics window for the packet; updating a probability distribution of sampled bandwidth based on the selected bandwidth samples; determining whether traffic shaping is occurring in the network based on a density of the updated probability distribution of sampled bandwidth; and based on a determination that traffic shaping is occurring in the network, adjusting an upper limit of estimated bandwidth for the network based on an estimated traffic shaping rate, the estimated traffic shaping rate determined based on the updated probability distribution.

20 Claims, 7 Drawing Sheets

(56) References Cited

OTHER PUBLICATIONS

G. Kesidis and T. Konstantopoulos, "Extremal shape-controlled traffic patterns in high-speed networks," in IEEE Transactions on Communications, vol. 48, No. 5, pp. 813-819, May 2000, doi: 10.1109/26.843194 (Year: 2000).*

QoS: Regulating Packet Flow Configuration Guide, Cisco IOS Release 15M&T; Cisco Systems, Inc., San Jose, CA; pp. 1-34; Feb. 20, 2013.

Flach T, Papageorge P, Terzis A, et al. An internet-wide analysis of traffic policing[C] // Proceedings of the 2016 ACM SIGCOMM Conference. 2016: 468-482.

* cited by examiner

TRAFFIC SHAPING DETECTION AND BANDWIDTH ESTIMATION FOR A NETWORK

TECHNICAL FIELD

This disclosure relates to multimedia communications, and in particular, to traffic shaping detection and bandwidth estimation for a network.

BACKGROUND

With the rapid development of networks and related applications, traffic transmitted in a network is becoming increasingly larger. For example, real-time multimedia (e.g., audio and/or video) communications have wide applications, such as conferences, live broadcasting, video chat sessions, webinars, and the like. As the number of communication sessions increases in a network, the total traffic on the network may approach or exceed the limit of a network, which typically has limited bandwidth.

To optimize network efficiency and provide better user experience, network operators can implement flow control mechanisms on intermediate nodes of the network, such as routers, to manage the flow of data within the network.

For example, traffic shaping, which limits the rate at which data can be sent, can be implemented in the network through a token bucket mechanism and a queue, with the token bucket often having a fixed bucket capacity and the system adds tokens to the token bucket at a fixed rate. When sending a packet over the network, a corresponding number of tokens are required to be obtained from the token bucket before the packet can be sent. If there are not enough tokens available in the bucket, the packet has to wait in the queue until a new token or several new tokens are generated.

SUMMARY

Disclosed herein are implementations of methods, apparatuses, and systems for traffic shaping detection and bandwidth estimation for a network.

A first aspect is a device that includes a memory and a processor. The processor is configured to execute instructions stored in the memory to select, from periodically sampled packets from the network, bandwidth samples each having a delay jitter greater than a jitter threshold, wherein the delay jitter of a packet is determined as the difference between a delay for the packet in the network and a minimum delay for all packets sampled within a delay statistics window for the packet; update a probability distribution of sampled bandwidth based on the selected bandwidth samples; determine whether traffic shaping is occurring in the network based on a density of the updated probability distribution of sampled bandwidth; and based on a determination that traffic shaping is occurring in the network, adjust an upper limit of an estimated bandwidth for the network based on an estimated traffic shaping rate, wherein the estimated traffic shaping rate is determined based on the updated probability distribution of sampled bandwidth.

A second aspect is a method for traffic shaping detection and bandwidth estimation for a network, including: selecting, by a processor from periodically sampled packets from the network, bandwidth samples each having a delay jitter greater than a jitter threshold, wherein the delay jitter of a packet is determined as the difference between a delay for the packet in the network and a minimum delay for all packets sampled within a delay statistics window for the packet; updating, by the processor, a probability distribution of sampled bandwidth based on the selected bandwidth samples; determining, by the processor, whether traffic shaping is occurring in the network based on a density of the updated probability distribution of sampled bandwidth; and based on a determination that traffic shaping is occurring in the network, adjusting, by the processor, an upper limit of estimated bandwidth for the network based on an estimated traffic shaping rate, wherein the estimated traffic shaping rate is determined based on the updated probability distribution of sampled bandwidth.

A third aspect is a non-transitory computer readable medium storing instructions operable to cause one or more processors to perform according the method described above.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
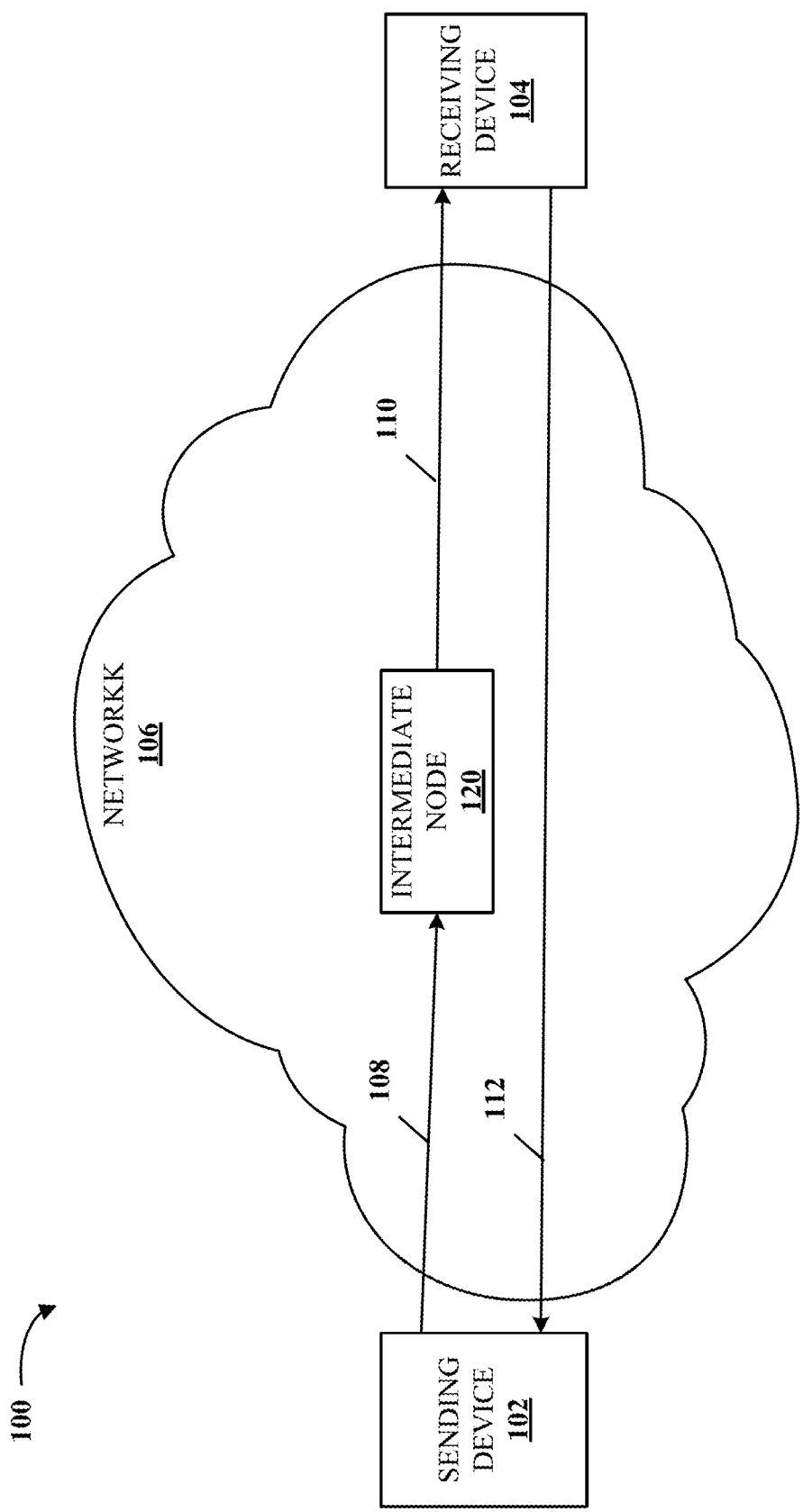
FIG. 1 is a diagram of an example of a system.

Flow control is crucial in preventing congestion, optimizing network performance, and ensuring efficient data transmission in a network. To optimize network efficiency and provide better user experience, network operators can implement flow control mechanisms on intermediate nodes of the network, such as routers, to manage the flow of data within the network.

Traffic shaping techniques, which are used to control the rate at which data can be sent, can be implemented in the network through a token bucket mechanism and a queue, for example, with the token bucket having a fixed bucket capacity and the system adds tokens to the token bucket at a fixed rate. When sending a packet over the network, a certain number of tokens are required to be obtained from the token bucket before the packet can be sent. If there are not enough tokens available in the token bucket, the packet has to wait in the queue until a new token or several new tokens are generated. The tokens can be added to the token bucket at a flow limit rate, which can be set by the network operator according to, for example, the desired average outbound (egress) rate for limiting the network traffic. The queue serves as a buffer for packets that exceed the rate limit of the token bucket, but it introduces queuing delays.

If the generated tokens are not consumed in time, they will continue to accumulate, which can be consumed at once if sudden traffic arrives later. This allows traffic burst, which can exceed the rate limit for traffic shaping for a short period of time, to pass through. As traffic shaping allows for traffic burst (as long as there are still tokens in the bucket), bandwidth estimation techniques based on bandwidth sampling or congestion control algorithms, such as the BBR algorithm, may overestimate the rate limit for network bandwidth due to the traffic burst observed in the network when traffic shaping is in place.

When the tokens are used up, which ends the traffic burst, the actual bandwidth for the network will be the rate limit of traffic shaping instead of the overestimated rate, and the bandwidth estimation or congestion control algorithm will eventually bring the estimated bandwidth back to the rate limit of traffic shaping, which can cause fluctuations in bandwidth estimation results. The rate limit for traffic shaping refers to the maximum allowable rate at which traffic is allowed to flow through a network node, such as an intermediate node, e.g., a router or switch. The fluctuations in bandwidth estimation results may cause the sending bitrate and packet generation rate to be adjusted in real time, which causes data over-sending and delays. For example, in real-time audio/video streaming, bit rate fluctuation may cause latency and affect video resolution, which ultimately affects audio/video fluency and clarity, and results in a lower Quality of Experience (QOE).

However, for a sending device ("sender"), it is often not aware of whether traffic shaping is taking place in the network when doing bandwidth estimation or congestion control. If the sending device does not take into consideration the effect of traffic shaping on the network bandwidth when traffic shaping occurs, it may continue to generate data at a rate that exceeds the rate limit of traffic shaping, which can cause additional queuing delays and affect the QOE. This can be particularly problematic for some delay-sensitive devices.

Several challenges remain for traffic shaping detection and rate estimation in a network. First, active traffic shaping detection generates additional network traffic, which can cause unnecessary traffic overhead. Second, there are numerous nodes in the network, and many other factors can also cause delay and bandwidth fluctuations. It can be difficult to separate the delays caused by traffic shaping from the ones caused by other factors. Other factors that can also cause delay include, for example, other traffic competing in the network, deterioration in the network or transmission capacity declines, etc. Additionally, when the transmission bitrate is lower than the rate limit of traffic shaping, the transmission bitrate is not restricted by traffic shaping, and the traffic shaping is unlikely to be detected from the network, so the sending bitrate can continue to change.

Implementations according to this disclosure address these problems and challenges using "passive" traffic shaping detection and rate limit estimation without generating additional network traffic overhead, among other things. By more accurately estimating the bandwidth when traffic shaping occurs (also referred to herein as the rate limit of traffic shaping, or the rate of traffic shaping), the sender can reduce transmission delay and jitters in the network. According to implementations of this disclosure, the sender performs traffic shaping detection and bandwidth estimation that uses sending and receiving packet timestamps and the amount of sending data to sample the bandwidth and calculate delay jitters, selects the bandwidth samples based on latency, and determines the probability distributions of the bandwidth samples and the density of the probability distributions, which is then used to determine whether traffic shaping is occurring in the network. If it is determined that traffic shaping is occurring, the sender estimates the rate limit of traffic shaping as the sampled value corresponding to the maximum probability. The estimated rate limit of traffic shaping can then be applied to the congestion control algorithm as the upper limit of the current bandwidth estimation, and the bandwidth estimation value cannot exceed the upper limit when calculating the size of the congestion window, thus preventing the sender from over-sending data, as well as reducing transmission delay and jitters.

According to implementations of this disclosure, the rate limit of traffic shaping can be determined with high accuracy with low computational overhead and without additional traffic. Implementations of this disclosure can work with all types of congestion control algorithms based on bandwidth sampling, and will not affect the congestion control algorithms during the traffic shaping detection phase. The traffic shaping detection phase can be adjusted according to the requirement of computational cost, which makes it easy to control and adapt.

Further details of traffic shaping detection and bandwidth estimation for a network are described herein with initial reference to a system in which it can be implemented.

FIG. 1 is a diagram of an example of a system 100. The system 100 includes multiple devices or apparatuses, (e.g., a sending device 102 and a receiving device 104), which communicate (e.g., send and receive multimedia content) via intermediate nodes (e.g., an intermediate node 120) of a network 106. The intermediate node 120 can include any node on a communication path within the network 106 between the sending device 102 and the receiving device 104. For example, the intermediate node 120 can include a server, a control node, a service node, an edge node (also referred to as an edge server), etc. The control node, for example, can be used for controlling the network traffic. While FIG. 1 shows only a certain number of devices, intermediate nodes, and networks, as can be appreciated, more or fewer of each can be included in the system 100. Traffic shaping can occur at one or more of the intermediate nodes, such as the intermediate node 120 of the network 106.

In some implementations, the system 100 can be implemented using general-purpose computers with a computer program that, when executed, carries out the methods, algorithms, processes, and/or instructions described herein. It should be noted that parts or components of the computing device 200 of FIG. 2 can include elements not limited to those shown in FIG. 2.

Each of the devices such as the devices 102 and 104, and the intermediate node 120 can be implemented by or can be any number of any configuration of computers, such as a microcomputer, a mainframe computer, a supercomputer, a general-purpose computer, an integrated computer, a database computer, or a remote server computer. The devices such as the device 102 or 104 can be any end-user device capable of multimedia communications such as a smartphone, a camera, a desktop computer, a laptop computer, a workstation computer, a tablet computer, a cell phone, a personal data assistant (PDA), a wearable computing device, or a computing device provided by a computing service provider (e.g., a web host or a cloud service provider). Each or some of the devices such as the device 102 or 104, and the intermediate node 120 can have a hardware configuration as shown by the computing device 200 of FIG. 2. However, other configurations are possible.

The network 106 can be any combination of any suitable type of physical or logical networks, such as a wireless network, a wired network, a local area network (LAN), a wide area network (WAN), a virtual private network (VPN), a cellular data network, a Bluetooth network, an infrared connection, an NFC connection, or the Internet. The network 106 can be considered to be an infrastructure for facilitating (e.g., enabling, carrying out, etc.) media sessions. The network 106 can include many other components other than those described below. For example, the network 106 can include components or services for signaling, network address translation (NAT), firewall traversal, identity verification, routing, and the like.

The intermediate nodes of the network 106 can be interconnected with each other. The intermediate nodes of the network 106, such as the intermediate node 120, can also be connected to user devices, such as the devices 102 and 104 as shown in FIG. 1. An intermediate node directly connected to a user device can be referred to as an "edge server."

In this disclosure, the term "directly connected" refers to establishing a connection between a first node and a second node in a network via no intermediate, routing, or forwarding node(s). That is, the direct connection can cause data to be sent and received between the first node and the second node without assistance or facilitation of any other node of the network. It should be noted that the "direct connection" is at the application level of the network, and establishing the "direct connection" does not exclude using assistant or facilitating apparatuses or devices, such as a gateway, a router, a switchboard, or any other routing or forwarding devices or apparatuses that do not function as application-level nodes of the network.

The intermediate nodes can receive, forward, and deliver multimedia data (such as data of media sessions) from and to different user devices. Some connections between the nodes can be bidirectional. Some other connections between the nodes can be unidirectional. In some implementations, an intermediate node can switch between roles of an edge node and a router node at different time, or function as both at the same time.

The network 106 may be implemented on an application layer of a computing network. For example, in a TCP/IP model, a computer-communications network may be partitioned into multiple layers. For example, in a hierarchical order from bottom to top, the multiple layers may include a physical layer, a network layer, a transport layer, and an application layer. Each of the foregoing layers may serve the layer above it and may be served by the layer below it. The application layer may be the TCP/IP layer that directly interacts with an end user with software applications. The network 106 may be implemented as application-layer software modules. In addition, part or all of the network 106 may be a public network (e.g., the Internet). In other words, the data traffic of the network 106 may be partially routed through the public network.

Figure 2:
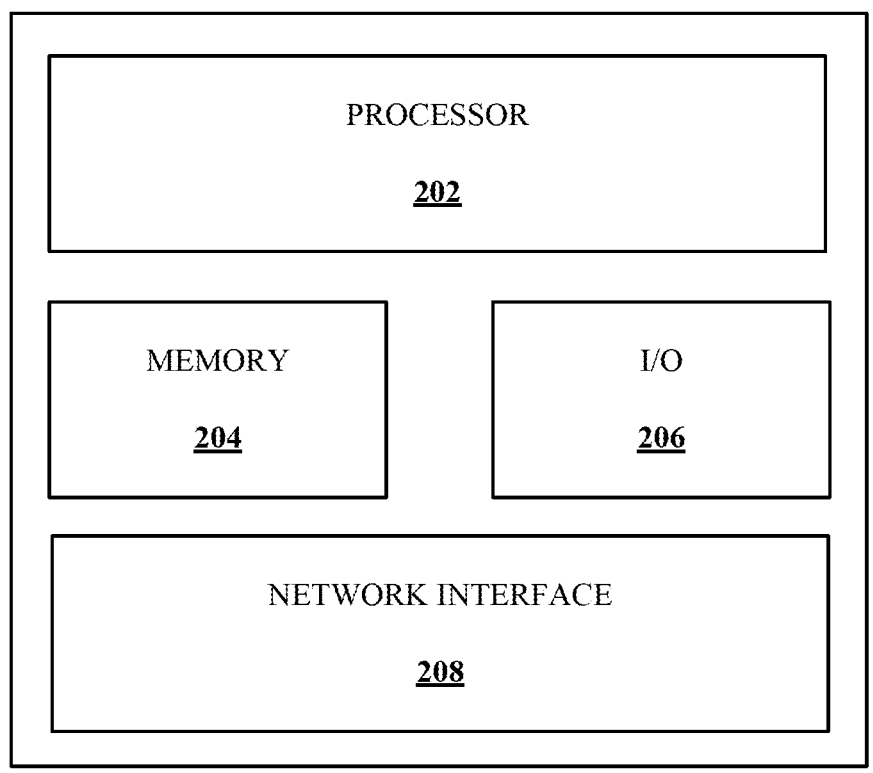
FIG. 2 is an example computing device.

FIG. 2 is an example of a computing device 200. The computing device 200 can include a processor 202, a memory 204, an input/output (I/O) device 206, and a network interface 208.

The processor 202 can be any type of device capable of manipulating or processing information. In some implementations, the processor 202 can include a central processor (e.g., a central processing unit or CPU). In some implementations, the processor 202 can include a graphics processor (e.g., a graphics processing unit or GPU). Although a single processor is shown, the computing device 200 can use multiple processors. For example, the processor 202 can include multiple processors distributed across multiple machines (each machine having one or more processors) that can be directly coupled or indirectly connected via a network (e.g., a local area network).

The memory 204 can include any transitory or non-transitory device capable of storing codes and data that can be accessed by the processor (e.g., via a bus). The memory 204 herein can be a random-access memory (RAM), a read-only memory (ROM), an optical/magnetic disc, a hard disk, a solid-state drive, a flash drive, a security digital (SD) card, a memory stick, a compact flash (CF) card, or any combination of any suitable type of storage device. In some implementations, the memory 204 can be distributed across multiple machines, such as in the case of a network-based memory or cloud-based memory. The memory 204 can store data (not shown), an operating system (not shown), and one or more applications (not shown). The data can include any data for processing (e.g., an audio stream, a video stream, or a multimedia stream). The applications can include one or more programs that permit the processor 202 to implement instructions to generate control signals for performing functions of the techniques in the following description. An application can include or can be an encoder that encodes a media stream to be transmitted to another apparatus. An application can include or can be a decoder that receives a compressed media stream, decodes (i.e., decompresses) the compressed media stream and stores or displays the media stream at the computing device 200. An application can be or can include one or more techniques for calculating scaling factors of uplink bandwidths.

In some implementations, the computing device 200 can further include a secondary (e.g., external) storage device (not shown). The secondary storage device can provide additional memory when high processing needs exist. The secondary storage device can include any suitable non-transitory computer-readable medium, such as a memory card, a hard disk, a solid-state drive, a flash drive, or an optical disc. Further, the secondary storage device can be a component of the computing device 200 or a shared device accessible by the computing device 200 via a network. In some implementations, the application in the memory 204 can be stored in whole or in part in the secondary storage device and loaded into the memory 204 as needed for processing.

The I/O device 206 can be implemented in various ways. For example, the I/O device can include a display that coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The display can be a liquid crystal display (LCD), a cathode-ray tube (CRT), or any other output device capable of providing a visual output to an individual. The I/O device 206 can also be any device capable of receiving a visual, acoustic, or tactile signal from a user, such as a keyboard, a numerical keypad, a mouse, a trackball, a touch-sensitive device (e.g., a touchscreen), a sensor, a microphone, a camera, or a gesture-sensitive input device. In some cases, an output device can also function as an input device, such as a touchscreen display configured to receive touch-based input.

The network interface 208 can be used to communicate signals and/or data with another device (e.g., via a communication network, such as the network 106). For example, the network interface 208 can include a wired means for transmitting signals or data from the computing device 200 to another device. For another example, the network interface 208 can include a wireless transmitter or receiver using a protocol compatible to the wireless transmission. The network interface 208 can be implemented in various ways, such as a transponder/transceiver device, a modem, a router, a gateway, a system-on-chip (SoC), a wired (e.g., RJ-45) network adapter, a wireless (e.g., Wi-Fi) network adapter, a Bluetooth adapter, an infrared adapter, a near-field communications (NFC) adapter, a cellular network antenna, or any combination of any suitable type of device capable of providing functions of communications with the network 106. In some implementations, the network interface 208 can be a generic or general-purpose network interface that is not dedicated to a specialized network and not adapted to a specialized (e.g., closed-source, proprietary, non-open, or non-public) network protocol. For example, the network interface can be a general network interface that supports the Transmission Control Protocol/Internet Protocol (TCP/IP) communications protocol family (or "suite"). For another example, the network interface can be a general network interface that only supports the TCP/IP communications protocol family. It should be noted that the network interface 208 can be implemented in various ways and not limited to the aforementioned examples.

Without departing from the scope of this disclosure, the computing device 200 can include more or fewer of parts, components, hardware modules, or software modules for performing functions of real-time multimedia communications.

Traffic shaping techniques, which are used to control the rate at which data can be sent, can be implemented at one or more of the intermediate nodes, such as the intermediate node 120, to optimize the efficiency for the network 106. For the sender such as the sending device 102, it is often not aware of whether traffic shaping is taking place at an intermediate node, such as the intermediate node 120, in the network 106 when doing bandwidth estimation or congestion control. If the sending device 102 does not take into consideration the effect of traffic shaping on the network bandwidth when traffic shaping occurs, it may continue to generate data at a rate that exceeds the rate limit of traffic shaping, which can cause additional queuing delays and affect the Quality of Experience (QOE). This can be particularly problematic for some delay-sensitive devices.

Figure 3:
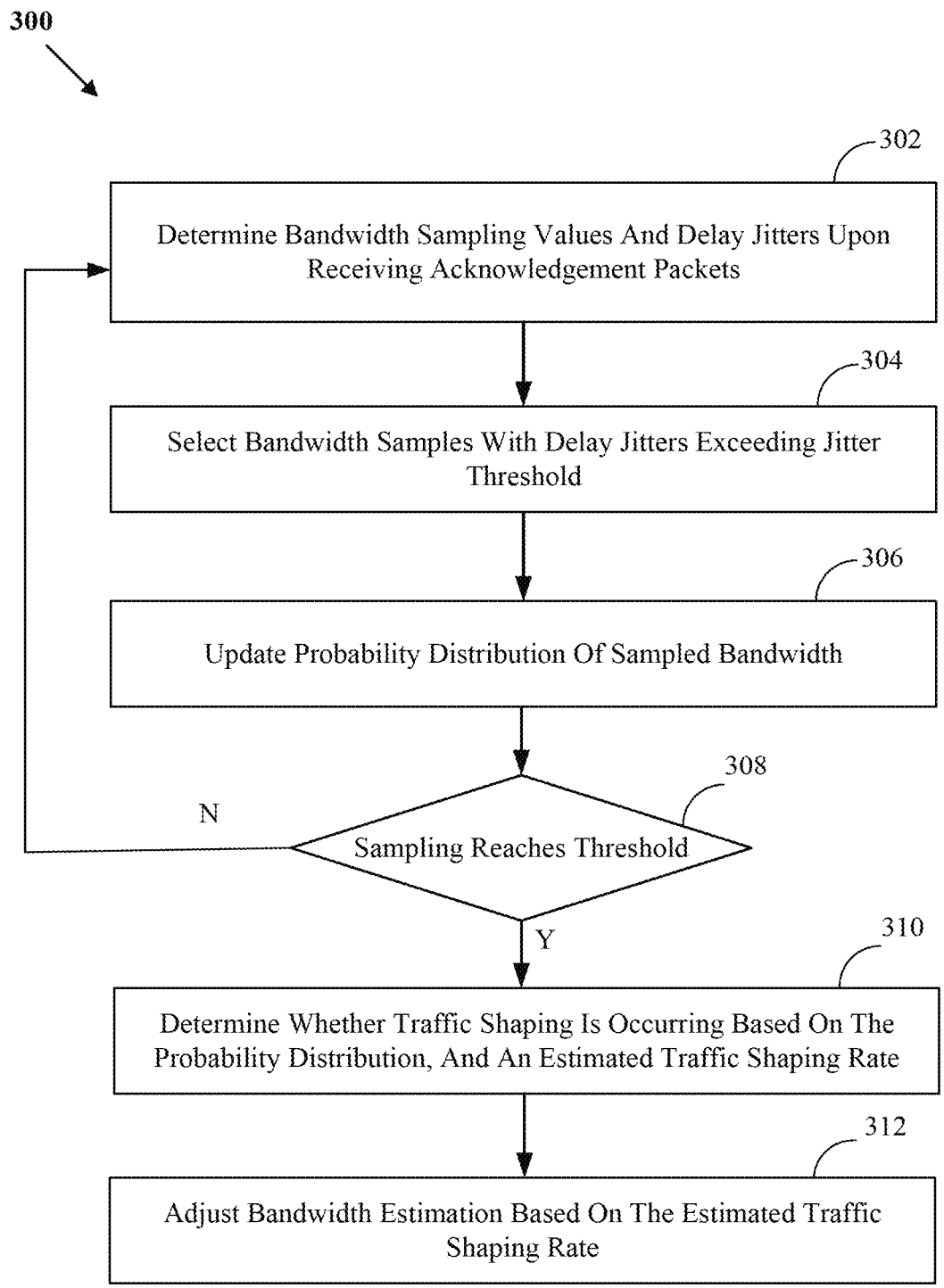
FIG. 3 is a flowchart of an example of a technique for traffic shaping detection and bandwidth estimation.

FIG. 3 is a flowchart of an example of a technique 300 for traffic shaping detection and bandwidth estimation for a network. The technique 300 can be implemented by a device, such as the sending device 102, that is connected to a network, such as the network 106, to participate in communication sessions (such as an audio or video communication). For example, a media stream captured or generated at the device can be encoded by an encoder (e.g., a video and/or an audio encoder) of the device (e.g., the sending device 102) for transmission, via the network, to one or more receiving devices ("receivers"), e.g., the receiving device 104. The technique 300 can be implemented, for example, at the network layer of the sending device 102 of FIG. 1.

The technique 300 can be implemented, for example, as a software program that may be executed a computing device, such as the sending device 102 or the computing device 200. The software program can include machine-readable instructions that may be stored in a memory such as the memory 204 or the secondary storage, and that, when executed by a processor, such as the processor 202, may cause the computing device to perform the technique 300. The technique 300 can be implemented using specialized hardware or firmware. Multiple processors, memories, or both, may be used.

At 302, the techniques 300 determines bandwidth sampling values and delay jitters upon receiving acknowledgement (ACK) packets.

Bandwidth samples can be obtained periodically by a user device such as the sending device 102, and can include, for example, packets that are transmitted during a communication session of respective connected devices (e.g., between the sending device 102 and the receiving device 104). The periodically sampled packets can include packets that are sampled regularly or irregularly (e.g., randomly) at fixed time intervals, or packets that are sampled at time intervals set based on changing network conditions, etc.

Information regarding data packets that are sent and acknowledged ("ACKed") is used for calculating the bandwidth sampling values and delay jitters. The ACKed packets are sampled from the network (e.g., the network 106). Other types of packets can also be used for determining bandwidth sampling values and delay jitters. Terms such as the acknowledgement packets, ACK packets and ACKed packets are used interchangeably herein.

The sending and receiving timestamps of the bandwidth samples and the amount of sending data can be used to determine the bandwidth sampling values and delay jitters. For example, the bandwidth sampling values and delay jitters can be determined, by the computing device, such as the sending device 102 of FIG. 1 or the computing device 200 of FIG. 2. The bandwidth sampling values and delay jitters can be determined based on the number of ACK packets received in a current sampling period, and the sampling time interval.

Figure 5A:
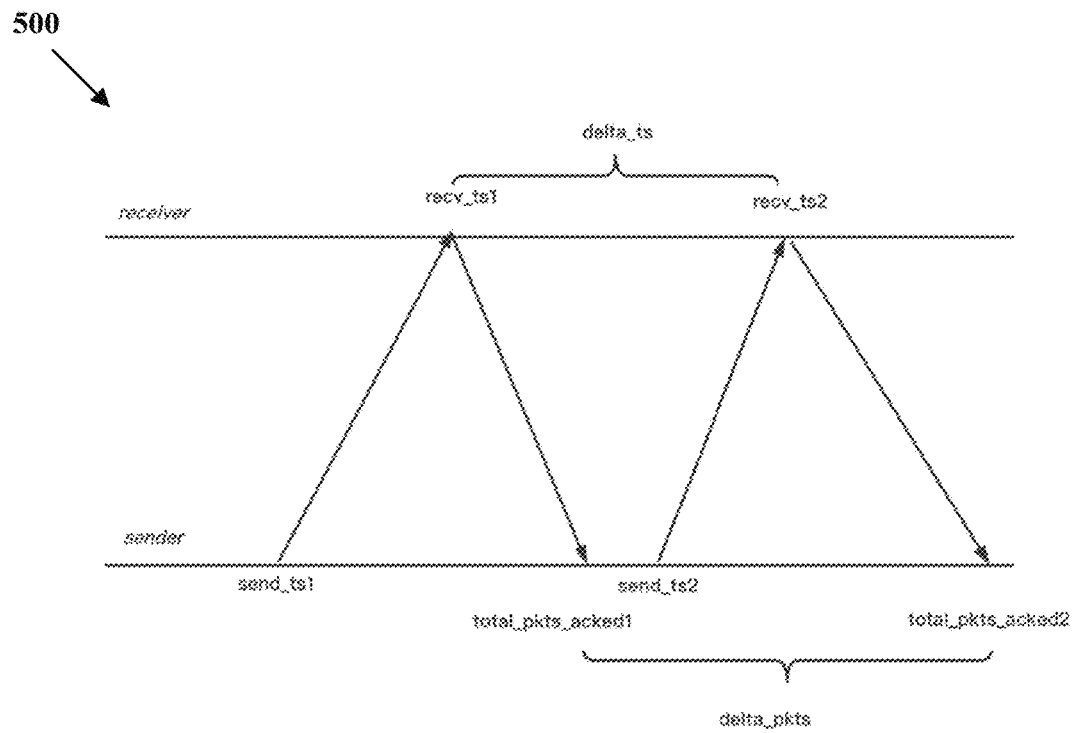
FIG. 5A is a diagram illustrating an example of determining a delay jitter for a bandwidth sample.

The number of ACK packets received in the current sampling period can be determined in various ways. Referring to FIG. 5A as an illustrative example, the number of ACK packets received in the current sampling period can be determined by subtracting the total (cumulative) number (or bytes) of ACK packets as indicated in the last sampling period, represented by total_pkts_acked1 in FIG. 5A, from the total (accumulative) number (or bytes) of ACK packets received when the current ACK packet is received during the current sampling period, represented by total_pkts_acked2 in FIG. 5A.

The sampling time interval can be determined, for example, by subtracting the receiving timestamp of the last ACK packet sampled in the last sampling period, represented by recv_ts1 in FIG. 5A, from the receiving timestamp of the current ACK packet, represented by recv_ts2 in FIG. 5A. A receiving timestamp indicates the time a receiving device ("receiver") sends out an ACK packet, which indicates the time the receiver receives a packet that it acknowledges in the ACK packet. The bandwidth sampling value $bw_{smpl}$, which represents the sampled bandwidth, can be determined as the number of ACK packets in the current sampling period divided by the sampling time interval, as follows:

$$bw_{smpl} = \frac{\text{total\_pkts\_acked2} - \text{total\_pkts\_acked1}}{\text{recv\_ts2} - \text{recv\_ts1}} \quad \text{(Equation 1)}$$

Other ways can also be used to determine the bandwidth sampling value without using Equation 1. For example, the bandwidth sampling value can be determined based on other types of packet data, which can be sampled and measured in various ways. The bandwidth sampling value can also be determined, for example, using different techniques depending on the network conditions.

The delay jitter of a bandwidth sample, such as a packet i, can be determined as the difference between a delay for the packet i in the network and a minimum delay for all packets sampled within a certain period (such as, for example, within a delay statistics window $\Delta_t$). The delay statistics window can be fixed or adjustable, which would include all packets sampled within the delay statistics window up to the current packet. In an example, the delay statistics window can be adjustable, with a default value at 10 seconds.

The delay for the packet i can be determined as the one-way delay of the packet i $delay_i = t_{recv} - t_{send}$, wherein $t_{send}$ represents the sending timestamp of the packet i, and $t_{recv}$ represents the receiving timestamp of the packet i.

In some implementations, a delay statistic vector delay and a minimum delay $delay_{min}$ can be updated by adding the delay for the latest packet, such as the one-way delay value described above, and removing those delay values exceeding the delay statistics window ($\Delta_t$) from the delay statistic vector delay. As described above, the delay jitter can be determined as the difference between the one-way delay value of the latest packet and a minimum delay $delay_{min}$ within $\Delta t$. The minimum delay value $delay_{min}$ is updated based on the updated delay statistic vector. In one illustrative example, the minimum delay value $delay_{min}$ can be 18 ms. When the delay value of 19 ms of the latest packet is added to the delay statistic vector, the delay value 18 ms of the oldest packet is removed from the delay statistics window, and the minimum delay value $delay_{min}$ is updated to 19 ms.

Other ways can also be used to determine the delay jitter for the packet, without using the delay statistic vector. For example, data structures such as a queue, an array, a list, a circular buffer etc., can be used.

As previously mentioned, other types of packets can also be used, alone or in combination with the ACK packets, for determining bandwidth sampling values and delay jitters.

At 304, the technique 300 selects bandwidth samples with delay jitters greater than a jitter threshold $\delta$. The jitter threshold $\delta$ can be adjusted depending on the scenario. In an illustrative example, the jitter threshold can be set at 60 ms. The bandwidth sampling values of bandwidth samples with a delay jitter greater than the jitter threshold $\delta$ in the sampling time interval, represented by $bw'_{smpl}$, are selected from the bandwidth samples for determining whether traffic shaping is occurring in the network, as will be described below.

For example, let's say a sample packet P1 has a delay of 100 ms, and the minimum delay value $delay_{min}$ is 20 ms. The delay jitter of P1 is 100−20=80 ms. For another example, another sample packet P2 has a delay of 50 ms, and the minimum delay value $delay_{min}$ is the same 20 ms. Thus, the delay jitter for P2 is 50−20=30 ms. Suppose the jitter threshold is set as 60 ms. P1 will be selected because its delay jitter is 80 ms, which is above the jitter threshold. P2 will not be selected because its delay jitter is 30 ms, which is below the jitter threshold. The unselected samples can be discarded. The selected samples, such as P1, will be used at 306 for further processing.

At 306, the technique 300 updates a probability distribution of sampled bandwidth based on the selected bandwidth samples. The probability distribution of sampled bandwidth can be maintained and updated using, for example, a probability distribution histogram. The selected bandwidth samples, which, according to 304, have delay jitters greater than the jitter threshold $\delta$, can be used to update the probability distribution histogram. For example, the bandwidth sampling values of the selected bandwidth samples, $bw'_{smpl}$, can be used.

In some implementations, the probability distribution of sampled bandwidth can also be maintained and updated in other ways without using the probability distribution histogram, and can use techniques such as, for example, Probability Density Function or Cumulative Distribution Function plots, etc.

Below is an example of updating the probability distribution histogram using the selected bandwidth samples at 306. To reduce the computational overhead, fixed point arithmetic can be used in one or more of the steps described below. However, it should be understood that this is just an illustrative example, and the probability distribution can be updated in other ways.

First, the technique 300 calculates a position j in the probability distribution histogram based on the bandwidth sampling value of the current sample (that is the selected bandwidth sample) $bw'_{smpl}$:

$$j = \text{floor}\left(\frac{bw'_{smpl}}{res}\right) \quad \text{(Equation 2)}$$

where floor means round down, and res is the resolution for bandwidth estimation, e.g., 50 kbps. Then the technique 300 determines whether the position j determined for the current sample exceeds a maximum statistics value $idx_{max}$ of the probability distribution histogram, and if so, the technique 300 will update $idx_{max}$, and fill in the new probability value for $idx_{max}$ with 0: $p_j'=0, j=idx_{max}$.

Then, the technique 300 updates the probability values in the probability distribution histogram with an attenuation factor f in the range of [0,1] according to the following:

$$p_i' = p_i \times f \cdot (i=0,1,2) \quad \text{(Equation 3)}$$

Also, the technique 300 updates the probability of the current sample as follows:

$$p_j' = p_j + (1-f) \quad \text{(Equation 4)}$$

Additionally, the attenuation factor f can be updated so that the attenuation factor f shows an increasing trend (e.g., the longer the connection time, the more stable the probability distribution of the bandwidth sampling), and the $n^{th}$ sample can be updated as follows:

$$f' = \begin{cases} 0, & n = 0 \\ \frac{15}{16} \times f + \frac{0.9993}{16}, & n > 0 \end{cases} \quad \text{(Equation 5)}$$

In some implementations, when fixed point arithmetic is used, the probability values derived from the above may be further updated such that the sum of the entire probability distribution is approximated to 1. The probability values can be updated as follows:

$$p_i'' = \begin{cases} p_i' - \min\left(psum - 1, \frac{p_i'}{2^r}\right) & \text{if}(psum > 1) \\ p_i' - \min\left(psum - 1, \frac{p_i'}{2^r}\right) & \text{if}(psum < 1) \end{cases} \quad \text{(Equation 6)}$$

wherein psum represents the sum of the current probability distribution, and r is the number of right shifted bits of the length of vector p, i=0, 1, 2 . . . .

The above steps can be further illustrated in an example. Suppose f is 0.226, the resolution for bandwidth estimation res is 50 kbps, $p_3$ is 0.836, and $p_5$ is 0.164. Here $p_3$ corresponds to the probability of i=3, i.e., bandwidth sampling values between 150-200 kbps. $p_5$ corresponds to the probability of i=5, i.e., bandwidth sampling values between 250-300 kbps. A new bandwidth sample has a bandwidth sampling value of 475 kbps. The index for the new bandwidth sample is, according to Equation 2, $$\text{floor}\left(\frac{475}{50}\right) = 9.$$

This exceeds the maximum statistics value $idx_{max}$, which was 5. Therefore, $idx_{max}$ is updated to 9, and $p_9$ is set as 0. Then the existing probability values can be updated with the attenuation factor f, which is 0.226, so $p_3'$ will be 0.189, and $p_5'$ will be 0.037. The (updated) probability for the current sample, $p_9'$, will be 0.774 according to Equation 4. Then, according to Equation 5, f can be updated as $$\frac{15}{16} \times 0.226 + \frac{0.9993}{16} = 0.274.$$

At 308, the technique 300 determines if sampling reaches a threshold, e.g., smpl_threshold. When the number of samples is large enough to reach the threshold smpl_threshold, which indicates that a sufficient number of packets have been experiencing queuing delays, the technique 300 can begin to determine the density of distribution of bandwidth sampling at 310, discussed below. The threshold smpl_threshold is positively correlated to the value of the stable bandwidth sampling (the average bandwidth sampling rate over a period of time, e.g., $bw_{longterm}$), which means the larger the current connection bitrate is, the larger the threshold for the number of samples is. For example, the threshold smpl_threshold can be determined as follow:

$$\text{smp\_threshold} = \frac{bw_{longterm}}{MTU} + \mu \qquad \text{(Equation 7)}$$

where μ is the starting offset, $bw_{longterm}$ represents the stable bandwidth sampling, and MTU represents maximum transmission units. For example, p can be set to a value of 50. MTU can be set to, for example, 1500 bytes.

At 310, the technique 300 determines whether traffic shaping is occurring in the network based on the probability distribution, and if so, an estimated traffic shaping rate. The density of the probability distribution can be determined from the updated probability distribution and used for determining whether traffic shaping occurs and the estimated traffic shaping rate.

For example, in those implementations that use probability distribution histogram, the density of the updated probability distribution histogram can be determined by:

$$\frac{idx_{right} - idx_{left}}{idx_{right}} \qquad \text{(Equation 8)}$$

wherein $idx_{left}$ represents a first minimum index derived from the updated probability distribution histogram that is greater than a first probability threshold, and $idx_{right}$ represents a second minimum index derived from the updated probability distribution histogram that is greater than a second probability threshold, the second probability threshold being higher than the first probability threshold. Ø represents a density threshold. The first minimum index and the second minimum index can be determined from, for example, a cumulative probability distribution histogram based on the probability distribution histogram updated at 306. It is determined that traffic shaping is occurring in the network when the density is lower than the density threshold:

$$\frac{idx_{right} - idx_{left}}{idx_{right}} < \emptyset.$$

Otherwise, no traffic shaping is detected. If traffic shaping is determined to be occurring in the network, the technique 300 determines the estimated traffic shaping rate as follows:

$$bw_{shaping} = \alpha(idx_{right}+1)*res \qquad \text{(Equation 9)}$$

where α is the scaling factor, with a default value at greater than 1, and res is the bandwidth estimation resolution.

In some implementations, a cumulative probability distribution vector cf can be determined based on the probability distribution vector p, which is updated at 306. cf can be determined as $cf_i$, i=0, 1, 2 . . . , according to the probability distribution vector p of the probability distribution histogram. $p=p_i$, i=0, 1, 2 . . . The first minimum index, $idx_{left}$, is the smallest index i that has a cumulative probability distribution value that is greater than the first probability threshold $cf_{left}$: $cf_i > cf_{left}$. The second minimum index $idx_{right}$ is the smallest index i that has a cumulative probability distribution value that is greater than the second probability threshold $cf_{right}$: $Cf_i > cf_{right}$.

In the following illustrative examples, the first probability threshold $cf_{left}$ can have a value of 0.3, which corresponds to $30^{th}$ percentile, and the second probability threshold $cf_{right}$ can have a value of 0.9, which corresponds to $90^{th}$ percentile, and Ø the density threshold is 0.4. The bandwidth estimation resolution res has a value of 50 kbps.

Figure 6:
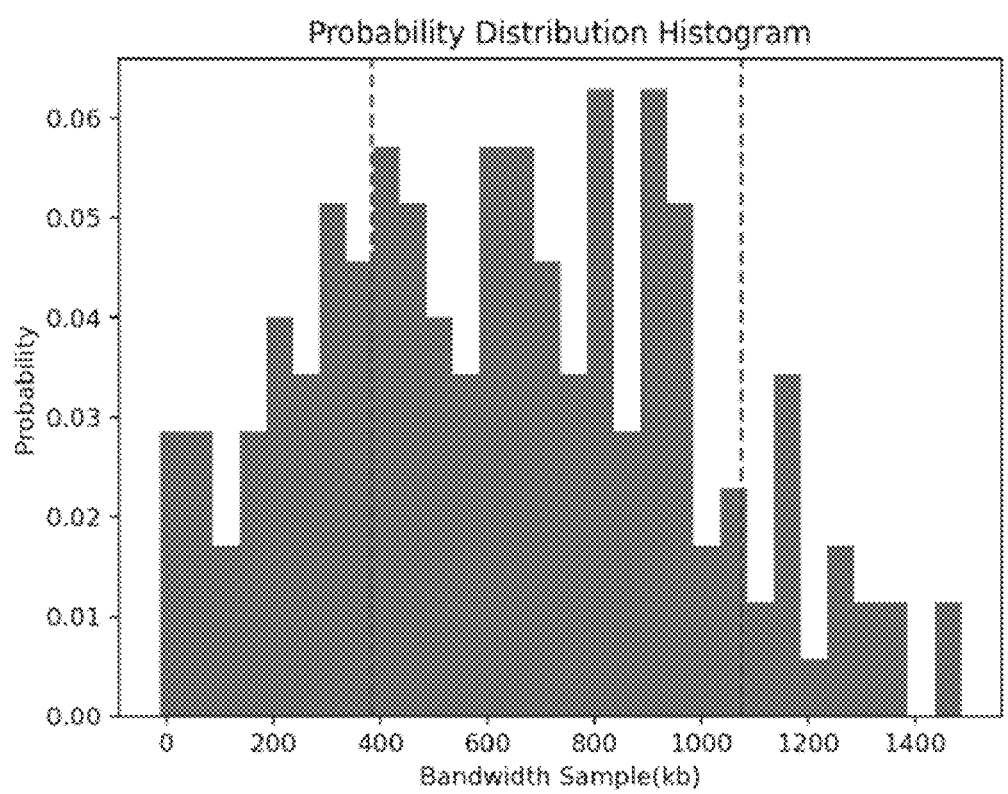
FIG. 6 is a diagram illustrating an example probability distribution histogram when traffic shaping is determined not to be occurring in the network.

FIG. 6 is a diagram illustrating an example probability distribution histogram when traffic shaping is not detected in the network. In this example, the density of the updated probability distribution histogram can be determined based on Equation 8, in which $idx_{left}$ is 8, and $idx_{right}$ is 22. The density can be determined as (22−8)/22=0.64, which is higher than the density threshold of 0.4. Therefore, it is determined that the traffic shaping is not occurring in the network.

Figures 7A, 7B:
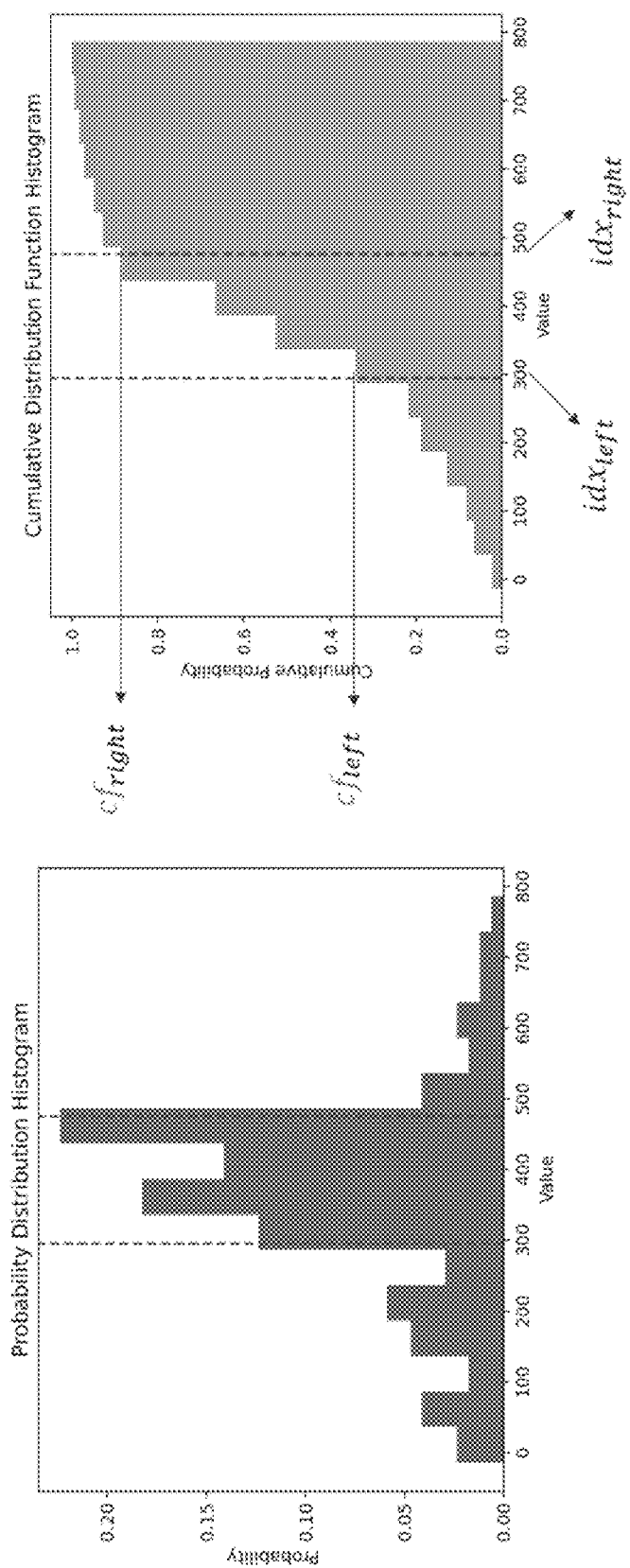
FIG. 7A is a diagram illustrating an example probability distribution histogram when traffic shaping is determined to be occurring in the network.
FIG. 7B is a diagram illustrating an example cumulative probability distribution histogram when traffic shaping is determined to be occurring in the network.

FIG. 7A is a diagram illustrating an example probability distribution histogram when traffic shaping is determined to be occurring in the network. FIG. 7B is a diagram illustrating an example cumulative probability distribution histogram when traffic shaping is determined to be occurring in the network. The cumulative probability distribution histogram in FIG. 7B is determined based on the probability distribution histogram in FIG. 7A. In this example, the first probability threshold $cf_{left}$ has a value of 0.3, and the second probability threshold $cf_{right}$ has a value of 0.9. It can be determined from the cumulative probability distribution histogram in FIG. 7B that the corresponding first minimum index, $idx_{left}$, is 6, and the second minimum index, $idx_{right}$, is 9. According to Equation 8, the density is determined as (9−6)/9=0.33, which is lower than the density threshold of 0.4. Therefore, it is determined that the traffic shaping is occurring in the network. Assume that the scaling factor α has a value of 1.1, and the bandwidth estimation resolution res has a value of 50 kbps, the estimated traffic shaping rate can be determined according to Equation 9 as 1.1*(9+1)*50=550 kbps.

At 312, the technique 300 adjusts bandwidth estimation based on the estimated traffic shaping rate. The estimated rate of the traffic shaping $bw_{shaping}$ is used as the current upper limit of the bandwidth estimation. The bandwidth estimation $bw_{estimation}$ is the maximum value derived from the recent rounds of bandwidth sampling. The bandwidth estimation should not exceed the upper limit when calculating the size of the congestion window, thus preventing the sender from over-sending data. The congestion window is calculated as follows, where $RTT_{min}$ is the minimum value of round trip delay:

$$cwnd = RTT_{min} \times \min(bw_{shaping}, bw_{estimation}) \quad \text{(Equation 10)}$$

Figure 5B:
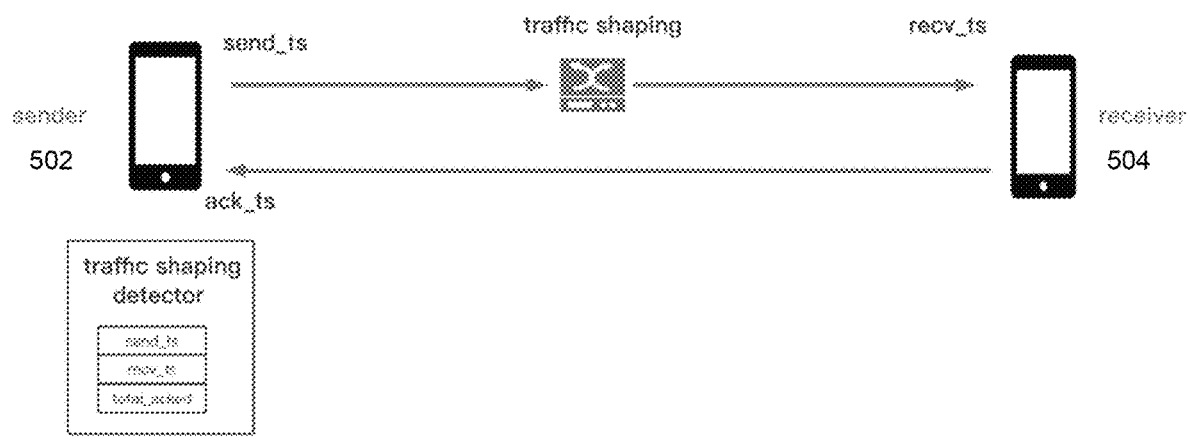
FIG. 5B is a diagram illustrating an example of traffic shaping detection for a sending device.

In an illustrative example according to FIG. 5B, a traffic shaping detector can be implemented at a sending device to determine whether traffic shaping is occurring in the network. The traffic shaping detector can be implemented by a sender 502, which can be the sending device 102 of FIG. 1. The traffic shaping detector can be implemented, for example, according to one or more operations of the technique 300 described above, or according to one or more operations of a technique 400, which will be described below. The traffic shaping detector can have input parameters such as, for example, send_ts, recv_ts and total_acked, and the output can include, for example, a determination of whether traffic shaping is occurring in the network, the estimated traffic shaping rate, an adjusted congestion control algorithm, or a combination of the above. The parameter send_ts can be used to indicate the time (e.g., timestamp) at which a packet (e.g., a data packet L) that is the latest one to be ACKed and sampled ("the current bandwidth sample"), is sent from the sender 502 to a receiving device in a network. The parameter recv_ts can be used to indicate the time (e.g., timestamp) at which the data packet L is received by the receiving device, such as a receiver 504 in FIG. 5B. recv_ts can also indicate the time (e.g., timestamp) at which the receiving device sends an ACK packet to the sending device, which indicates that the data packet L is received. The parameters send_ts and recv_ts can be used to determine the delay and the delay jitter for the current bandwidth sample, as described above at 302. For example, the delay jitter of the current bandwidth sample can be determined as the difference between a delay for the current bandwidth sample in the network, which can be the difference between recv_ts and send_ts, and a minimum delay for all packets sampled within a certain period, e.g., the delay statistics window $\Delta_t$.

As described above, the parameter total_acked can be used to indicate the total (accumulative) number (or bytes) of packets acknowledged in the current sampling period. As described in 302, the number (or bytes) of packets acknowledged in the current sampling period can be determined as the difference between total_acked in the current sampling period and total_acked in the last sampling period. Then the bandwidth sampling value can be determined according to 302, and so on.

Figure 4:
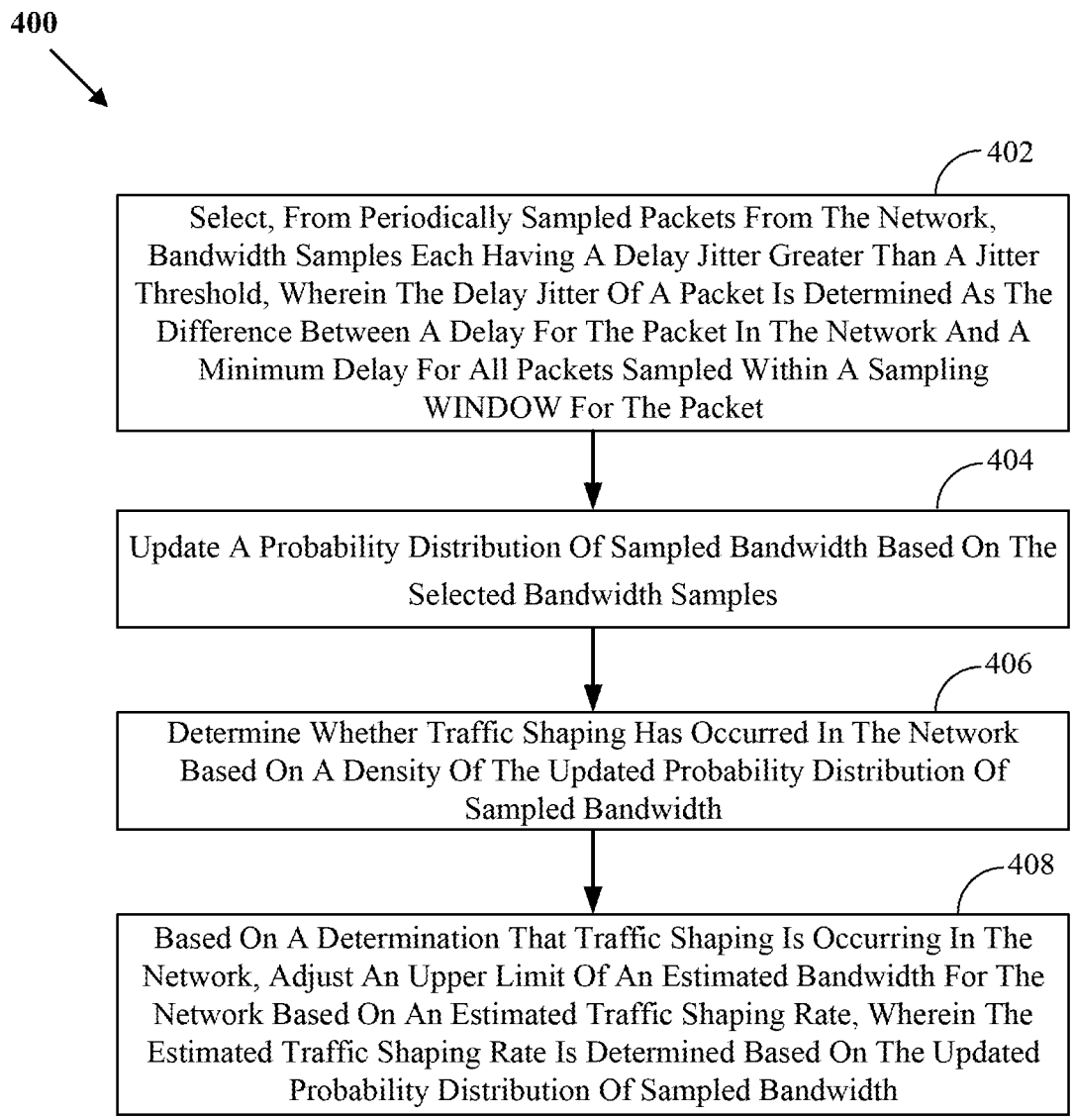
FIG. 4 is a flowchart of an example of a technique for traffic shaping detection and bandwidth estimation.

FIG. 4 is a flowchart of an example of a technique 400 for traffic shaping detection and bandwidth estimation for a network. The technique 400 may be similar to, or based upon, the technique 300 of FIG. 3. Without repeating every detail already described in the technique 300, the technique 400 is described below with reference to the technique 300 and the examples therein. The technique 400 can be implemented as software and/or hardware modules in the system 100 in FIG. 1. For example, the technique 400 can be implemented as software modules of a sending device, such as the sending device 102 of FIG. 1. For another example, the software modules implementing the technique 400 can be stored in a memory, such as the memory 204 of FIG. 2 and which can be the memory of the sending device 102, as instructions and/or data executable by a processor, such as the processor 202 of FIG. 2 and which can be a processor of the sending device 102. For example, the technique 400 can be executed when communications (such as an audio or video communication) occur between two user devices, such as the sending device 102 and the receiving device 104 in FIG. 1. For another example, the technique 400 may be implemented in hardware as a specialized chip storing instructions executable by the specialized chip.

In some implementations, the technique 400 can include obtaining sampled packets as bandwidth samples, which can include packets that are periodically sampled from the network, such as the network 106. The periodically sampled packets can include packets that are sampled regularly or irregularly (e.g., randomly) at fixed time intervals, or packets that are sampled at time intervals set based on changing network conditions. The bandwidth samples can be obtained by a user device such as the sending device 102, and can include, for example, packets that are transmitted during communication sessions of respective connected devices (e.g., media sessions between user devices such as the sending device 102 and the receiving device 104). As used in this disclosure, "obtain" can mean to form, produce, select, identify, construct, determine, receive, specify, generate, or other obtain in any manner whatsoever.

At 402, the technique 400 includes selecting, from periodically sampled packets received from the network, bandwidth samples having a delay jitter greater than a jitter threshold. The periodically sampled packets can include packets that are sampled regularly or irregularly (e.g., randomly) at fixed time intervals, or packets that are sampled at time intervals set based on changing network conditions. The periodically sampled packets can be acknowledgement (ACK) packets, such as the ones are sent from a receiving device to a sending device. The delay jitter of a packet is determined as the difference between a delay for the packet in the network and a minimum delay for all packets sampled within a delay statistics window for the packet. The delay statistics window can be fixed or adjustable, and can include all packets sampled within the delay statistics window prior to the current packet. The delay jitter can be determined similar to 302. Also, the bandwidth sampling values for the bandwidth samples can be determined similar to 302, which can be used along with the delay jitters for updating a probability distribution of sampled bandwidth. The bandwidth samples having the delay jitter greater than the jitter threshold can be selected similar to 304.

In some implementations, a delay statistics vector is updated for the delay statistics window by adding delays for the periodically sampled packets from the network and removing delays for those packets sampled outside of the delay statistics window, such as the ones sampled prior to the delay statistics window. Then, the minimum delay for all packets is determined for the delay statistics window based on the updated delay statistics vector.

At 404, the technique 400 updates a probability distribution of sampled bandwidth based on the selected bandwidth samples. For example, the probability distribution of sampled bandwidth can be updated based on the selected bandwidth samples similar to 306. For example, the delay jitters determined at 302, as well as the bandwidth sampling values, can be used for updating a probability distribution of sampled bandwidth.

In some implementations, updating the probability distribution of sampled bandwidth based on the selected bandwidth samples further includes updating a probability distribution histogram of sampled bandwidth based on the selected bandwidth samples.

At operation 406, the technique 400 determines whether traffic shaping is occurring in the network based on a density of the updated probability distribution of sampled bandwidth.

In some implementations, before proceeding to operation 406, the technique 400 determines whether sampling reaches a threshold, similar to 308.

The density of the updated probability distribution of sampled bandwidth can be determined similar to 310. In some implementations, determining whether traffic shaping is occurring in the network based on the density of the updated probability distribution of sampled bandwidth further includes determining whether traffic shaping is occurring in the network based on a density of the updated probability distribution histogram. For example, it can be determined that traffic shaping is occurring in the network in response to the density of the updated probability distribution histogram being lower than a threshold, wherein the density of the updated probability distribution histogram is determined using a first minimum index and a second minimum index derived from the updated probability distribution histogram, and the second minimum index is greater than the first minimum index.

For example, in some implementations, the density of the updated probability distribution histogram is determined by $$\frac{idx_{right} - idx_{left}}{idx_{right}},$$

and the traffic shaping is determined to have occurred in the network when $$\frac{idx_{right} - idx_{left}}{idx_{right}} < \emptyset,$$

wherein $idx_{left}$ represents the first minimum index derived from the updated probability distribution histogram that is greater than a first probability threshold, and $idx_{right}$ represents the second minimum index derived from the updated probability distribution histogram that is greater than a second probability threshold, the second probability threshold is higher than the first probability threshold, and $\emptyset$ represents a density threshold. As previously described and not repeated herein, FIGS. 7A and 7B show an example when it is determined that the traffic shaping is occurring in the network, and FIG. 6 shows an example when it is determined that the traffic shaping is not occurring in the network.

At operation 408, based on a determination that traffic shaping is occurring in the network, the technique 400 adjusts an upper limit of an estimated bandwidth for the network based on an estimated traffic shaping rate, wherein the estimated traffic shaping rate is determined based on the updated probability distribution of sampled bandwidth.

In some implementations, adjusting the upper limit of the estimated bandwidth for the network based on the estimated traffic shaping rate further includes: determining the estimated traffic shaping rate based on the second minimum index; and adjusting the upper limit for the estimated bandwidth based on the estimated traffic shaping rate and an estimated bandwidth value derived from bandwidth sampling in the network. The adjusted upper limit for the estimated bandwidth is used for traffic control in the network. For example, the upper limit for the estimated bandwidth can be adjusted similar to 312. The estimated bandwidth value derived from bandwidth sampling in the network can be, for example, the bandwidth sampling value determined similar to 302.

In some implementations, the estimated bandwidth is not to exceed the upper limit, and the size of a congestion window cwnd used for traffic control in the network and preventing the sender from over-sending data is determined by Equation 10, as previously described.

Going back to the example above in which the density of the updated probability distribution histogram is determined by $$\frac{idx_{right} - idx_{left}}{idx_{right}},$$

in some implementations, the estimated traffic shaping rate is determined by $\alpha(idx_{right}+1)*res$, wherein $\alpha$ represents a scaling factor greater than 1, and res represents bandwidth estimation resolution.

In some implementations, determining whether traffic shaping is occurring in the network based on the density of the updated probability distribution of sampled bandwidth further includes: based on a determination that the number of selected bandwidth samples reaches a predefined threshold, determining whether traffic shaping is occurring in the network based on the density of the updated probability distribution of sampled bandwidth, wherein the predefined threshold is positively correlated to a current connection bitrate.

As described above, a person skilled in the art will note that all or a portion of the aspects of the disclosure described herein can be implemented using a general-purpose computer/processor with a computer program that, when executed, carries out any of the respective techniques, algorithms, and/or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), field-programmable gate arrays (FPGAs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination.

The aspects of the disclosure described herein can be described in terms of functional block components and various processing operations. The disclosed processes and sequences may be performed alone or in any combination.

Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

Although the techniques 300 and 400 and the accompanying examples are described as in the sender's network layer. These techniques can also be implemented at another layer of the network, such as the application layer.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for traffic shaping detection and bandwidth estimation for a network, comprising:
a memory; and
a processor, the processor configured to execute instructions stored in the memory to:
select, from periodically sampled packets from the network, bandwidth samples each having a delay jitter greater than a jitter threshold, wherein the delay jitter of a packet is determined as a difference between a delay for the packet in the network and a minimum delay for all packets sampled within a delay statistics window for the packet;
update a probability distribution of sampled bandwidth based on the selected bandwidth samples;
determine whether traffic shaping is occurring in the network based on a density of the updated probability distribution of sampled bandwidth; and
based on a determination that traffic shaping is occurring in the network, adjust an upper limit of an estimated bandwidth for the network based on an estimated traffic shaping rate, wherein the estimated traffic shaping rate is determined based on the updated probability distribution of sampled bandwidth.

2. The apparatus of claim 1, wherein the instructions to update the probability distribution of sampled bandwidth based on the selected bandwidth samples comprise instructions to:
update a probability distribution histogram of sampled bandwidth based on the selected bandwidth samples.

3. The apparatus of claim 1, wherein the instructions to determine whether traffic shaping is occurring in the network based on the density of the updated probability distribution of sampled bandwidth further comprise instructions to:
determine that traffic shaping is occurring in the network in response to the density of the updated probability distribution being lower than a threshold, wherein the density of the updated probability distribution is determined using a first minimum index and a second minimum index derived from the updated probability distribution, and the second minimum index is greater than the first minimum index.

4. The apparatus of claim 3, wherein the instructions to adjust the upper limit of the estimated bandwidth for the network based on the estimated traffic shaping rate comprise instructions to:
determine the estimated traffic shaping rate based on the second minimum index; and
adjust the upper limit for the estimated bandwidth based on the estimated traffic shaping rate and an estimated bandwidth value derived from bandwidth sampling in the network, wherein the adjusted upper limit for the estimated bandwidth is used for traffic control in the network.

5. The apparatus of claim 4, wherein the estimated bandwidth is not to exceed the upper limit, and a size of a congestion window cwnd used for traffic control in the network and preventing from over-sending data is determined by:

$$cwnd = RTT_{min} \times \min(bw_{shaping}, bw_{estimation})$$

wherein $bw_{shaping}$ represents the estimated traffic shaping rate, $bw_{estimation}$ represents the estimated bandwidth value derived from recent rounds of bandwidth sampling in the network, and $RTT_{min}$ represents the minimum value of round trip delay.

6. The apparatus of claim 3, wherein the density of the updated probability distribution is determined by $$\frac{idx_{right} - idx_{left}}{idx_{right}},$$

and the traffic shaping is determined to have occurred in the network when $$\frac{idx_{right} - idx_{left}}{idx_{right}} < \emptyset,$$

wherein $idx_{left}$ represents the first minimum index derived from the updated probability distribution that is greater than a first probability threshold, and $idx_{right}$ represents the second minimum index derived from the updated probability distribution that is greater than a second probability threshold higher than the first probability threshold, and $\emptyset$ represents a density threshold.

7. The apparatus of claim 5, wherein the estimated traffic shaping rate is determined by $\alpha(idx_{right}+1)*res$, wherein $\alpha$ represents a scaling factor greater than 1, and res represents bandwidth estimation resolution.

8. The apparatus of claim 1, wherein the instructions to determine whether traffic shaping is occurring in the network based on the density of the updated probability distribution of sampled bandwidth further comprise instructions to:
based on a determination that a number of selected bandwidth samples reaches a predefined threshold, determine whether traffic shaping is occurring in the network based on the density of the updated probability distribution of sampled bandwidth, wherein the predefined threshold is positively correlated to a current connection bitrate.

9. The apparatus of claim 1, wherein the instructions to select, from periodically sampled packets from the network, bandwidth samples each having a delay jitter greater than a jitter threshold, wherein the delay jitter of a packet is determined as the difference between a delay for the packet in the network and a minimum delay for all packets sampled within a delay statistics window for the packet further comprise instructions to:
update a delay statistics vector for the delay statistics window by adding delays for the periodically sampled packets from the network and removing delays for those packets sampled outside of the delay statistics window; and
determine the minimum delay for all packets for the delay statistics window based on the updated delay statistics vector.

10. A method of for traffic shaping detection and bandwidth estimation for a network, comprising:
- selecting, by a processor from periodically sampled packets from the network, bandwidth samples each having a delay jitter greater than a jitter threshold, wherein the delay jitter of a packet is determined as a difference between a delay for the packet in the network and a minimum delay for all packets sampled within a delay statistics window for the packet;
- updating, by the processor, a probability distribution of sampled bandwidth based on the selected bandwidth samples;
- determining, by the processor, whether traffic shaping is occurring in the network based on a density of the updated probability distribution of sampled bandwidth; and
- based on a determination that traffic shaping is occurring in the network, adjusting, by the processor, an upper limit of estimated bandwidth for the network based on an estimated traffic shaping rate, wherein the estimated traffic shaping rate is determined based on the updated probability distribution of sampled bandwidth.

11. The method of claim 10, wherein updating, by the processor, the probability distribution of sampled bandwidth based on the selected bandwidth samples comprises:
- updating, by the processor a probability distribution histogram of sampled bandwidth based on the selected bandwidth samples.

12. The method of claim 10, wherein determining, by the processor, whether traffic shaping is occurring in the network based on the density of the updated probability distribution of sampled bandwidth comprises:
- determining, by the processor, whether traffic shaping is occurring in the network based on a density of the updated probability distribution, wherein the density of the updated probability distribution is determined using a first minimum index and a second minimum index derived from the updated probability distribution, and the second minimum index is greater than the first minimum index.

13. The method of claim 12, wherein adjusting, by the processor, the upper limit of the estimated bandwidth for the network based on the estimated traffic shaping rate comprises:
- determining, by the processor, the estimated traffic shaping rate based on the second minimum index; and
- adjusting, by the processor, the upper limit for the estimated bandwidth based on the estimated traffic shaping rate and an estimated bandwidth value derived from bandwidth sampling in the network, wherein the adjusted upper limit for the estimated bandwidth is used for traffic control in the network.

14. The method of claim 13, wherein the estimated bandwidth is not to exceed the upper limit, and a size of a congestion window cwnd used for traffic control in the network and preventing from over-sending data is determined by:

$$cwnd = RTT_{min} \times \min(bw_{shaping}, bw_{estimation})$$

wherein $bw_{shaping}$ represents the estimated traffic shaping rate, $bw_{estimation}$ represents the estimated bandwidth value derived from recent rounds of bandwidth sampling in the network, and $RTT_{min}$ represents the minimum value of round trip delay.

15. The method of claim 12, wherein the density of the updated probability distribution is determined by $$\frac{idx_{right} - idx_{left}}{idx_{right}},$$

and the traffic shaping is determined to have occurred in the network when $$\frac{idx_{right} - idx_{left}}{idx_{right}} < \emptyset,$$

wherein $idx_{left}$ represents the first minimum index derived from the updated probability distribution that is greater than a first probability threshold, and $idx_{right}$ represents the second minimum index derived from the updated probability distribution that is greater than a second probability threshold higher than the first probability threshold, and $\emptyset$ represents a density threshold.

16. The method of claim 15, wherein the estimated traffic shaping rate is determined by $\alpha(idx_{right}+1)*res$, wherein $\alpha$ represents a scaling factor greater than 1, and res represents bandwidth estimation resolution.

17. The method of claim 10, wherein determining, by the processor, whether traffic shaping is occurring in the network based on the density of the updated probability distribution of sampled bandwidth further comprises:
- based on a determination that a number of selected bandwidth samples reaches a predefined threshold, determining, by the processor, whether traffic shaping is occurring in the network based on the density of the updated probability distribution of sampled bandwidth, wherein the predefined threshold is positively correlated to a current connection bitrate.

18. The method of claim 10, wherein selecting, by the processor, from periodically sampled packets from the network, bandwidth samples each having a delay jitter greater than a jitter threshold, wherein the delay jitter of a packet is determined as the difference between a delay for the packet in the network and a minimum delay for all packets sampled within a delay statistics window for the packet further comprises:
- updating a delay statistics vector for the delay statistics window by adding delays for the periodically sampled packets from the network and removing delays for those packets sampled outside of the delay statistics window; and
- determining the minimum delay for all packets for the delay statistics window based on the updated delay statistics vector.

19. A non-transitory computer readable medium storing instructions operable to cause one or more processors to perform operations according to claim 10.

20. The non-transitory computer readable medium according to claim 19, wherein determining, by the processor, whether traffic shaping is occurring in the network based on the density of the updated probability distribution of sampled bandwidth further comprises:
- based on a determination that a number of selected bandwidth samples reaches a predefined threshold, determining, by the processor, whether traffic shaping is occurring in the network based on the density of the updated probability distribution of sampled bandwidth, wherein the predefined threshold is positively correlated to a current connection bitrate.

* * * * *